US007382596B2

(12) United States Patent  
DeBella et al.

(10) Patent No.: US 7,382,596 B2  
(45) Date of Patent: Jun. 3, 2008

(54) METHOD AND APPARATUS FOR PROTECTING A DIGITAL VIDEO RECORDER

(75) Inventors: John A. DeBella, Clearwater, FL (US); Konstantin Ivanov, St. Petersburg, FL (US); Hung Van Tu, Kenneth City, FL (US)

(73) Assignee: Diversified Technology Group, Inc., Largo, FL (US)

( * ) Notice: Subject to any disclaimer, the term of this patent is extended or adjusted under 35 U.S.C. 154(b) by 662 days.

(21) Appl. No.: 11/093,112

(22) Filed: Mar. 29, 2005

(65) Prior Publication Data  
US 2006/0227485 A1 Oct. 12, 2006

(51) Int. Cl.  
*H02H 1/04* (2006.01)  
*H01C 7/12* (2006.01)  
(52) U.S. Cl. ........................................ 361/118  
(58) Field of Classification Search ............... 361/118  
See application file for complete search history.

(56) References Cited

U.S. PATENT DOCUMENTS

| | | | | |
|---|---|---|---|---|
| 4,686,608 A | * | 8/1987 | Hosking | .............. 361/827 |
| 5,263,876 A | * | 11/1993 | Johnescu et al. | ........ 439/620.1 |
| 5,821,636 A | | 10/1998 | Baker et al. | |
| 5,835,326 A | | 11/1998 | Callaway | |
| 5,923,516 A | | 7/1999 | Young | |
| 6,252,754 B1 | | 6/2001 | Chaudhry | |
| 6,342,998 B1 | * | 1/2002 | Bencivenga et al. | ........ 361/107 |
| 6,347,963 B1 | * | 2/2002 | Falkenberg et al. | ......... 439/638 |
| 6,456,091 B1 | | 9/2002 | Lee et al. | |
| 6,504,936 B1 | | 1/2003 | Gutierrez | |
| 6,693,371 B2 | | 2/2004 | Ziegler et al. | |
| 2004/0113804 A1 | | 6/2004 | Cabrera et al. | |
| 2004/0137788 A1 | | 7/2004 | Dallmeier | |

FOREIGN PATENT DOCUMENTS

EP 1 437 931 A2 * 7/2004

* cited by examiner

Primary Examiner—Ronald W Leja  
(74) Attorney, Agent, or Firm—Larson & Larson, PA; Frank Liebenon

(57) ABSTRACT

The method and apparatus includes an uninterruptible power supply along with its rechargeable battery and a plurality of video protection circuits all within a common chassis. The video protection circuits are configured to protect the digital video recorder from surges introduced at the video cameras or cabling. The uninterruptible power supply is configured to provide power to the digital video recorder should a line voltage power failure occur and may also include a surge protector to further protect the digital video recorder from power line surges. Since all components are housed substantially within a common chassis, a method of isolating the video protection circuit and associated connectors from the radio frequency noise within the common chassis is described as well as a method and apparatus to allow removal and replacement of the video protection circuits should a power surge destroy them.

36 Claims, 7 Drawing Sheets

METHOD AND APPARATUS FOR PROTECTING A DIGITAL VIDEO RECORDER

BACKGROUND OF THE INVENTION

1. Field of the Invention

This invention relates to a method and apparatus for protecting various components of a digital video recording system.

2. Description of the Prior Art

Video monitoring systems often utilize a number of remotely located video cameras connected to one or more video recorders, perhaps such cameras are located in key locations to monitor various locations, grounds or entry ways to businesses and homes. These remotely located video cameras are most often connected to a video recorder or video switching system by, for example, coaxial cables that include a signal path and a ground/shield. Unfortunately, since video often operates at relatively low voltages, the video recorder is susceptible to unusual line conditions such as surges resulting in over-voltage or over-current conditions. If the camera or cabling is exposed to such a surge in electricity, that electricity may flow down the coaxial cable and may damage the video switching system and/or the video recorder. This may arise during an electrical storm, especially if lightning strikes near or at the video camera. Furthermore, voltage fluctuations, surges and other line variations may travel into a building over phone lines, data lines and/or power lines with the potential to damage the recorder and/or video switching system. In addition, it is possible to lose power to the recorder/switching system, which may impact the ability of the video recorder to monitor the remote video cameras.

In the past, several discrete products protected these recording/switching systems. Power to the recording/switching system may have been conditioned by a surge protector to reduce the risk of power surges emanating from building power. Additionally, to provide power to the recording/switching system in the event of a power outage or shortage, an uninterruptible power supply (UPS) may have been used, perhaps a UPS with an integrated surge protector. In addition, another system comprising one or more video surge protectors may have been added to help protect the video recorder from surges emanating from the video cameras or the cabling that connects the cameras to the video recorder. Additionally, if network connections or phone connections are made to the video recorder, discrete network surge protectors and phone line protectors may have been deployed.

What is needed is an integrated system to protect the video monitoring system from external power surges, electrostatic discharge, lightning and other hazardous forces, while providing back-up power to the monitoring system in the event of a power outage.

SUMMARY OF THE INVENTION

For the purposes of this application, the term video monitoring system will include the video cameras, cabling, video switching, video display and video recording components. The video recording components may be analog or digital recorders. Reference to the video recording system will encompass any recording equipment, including video switching, decoding, recording and display.

In one embodiment, a system for protecting a digital video recording system is provided, housed within a metal chassis. The system includes a battery and an uninterruptible power supply for providing power during a power disruption. The system also includes a line voltage input for providing power from a power source external to the metal chassis and a surge protection circuit also housed within said metal chassis and at least one female line voltage output connector configured to receive power from the uninterruptible power supply attached to the metal chassis and passing through a wall of the metal chassis. Further included is a plurality of video surge protectors each having a video input connector, a video output connector and a surge protection circuit and each mounted upon a conductive plate. The conductive plate is configured to cover an opening in the metal chassis and is affixed thereto. Each of the plurality of video surge protectors is electrically isolated from the rest and is electrically isolated from the metal chassis.

In another embodiment, an apparatus for protecting a digital video recording system is provided, housed within a metal chassis. The apparatus includes a plurality of video surge protectors each having a video input connector, a video output connector and a surge protection circuit and each mounted upon a conductive plate. The conductive plate is configured to cover an opening on the metal chassis and affixed thereto. Each of the plurality of video surge protectors is electrically isolated from the rest and each is electrically isolated from the metal chassis. A metal shield is electrically and physically attached to cover the opening in the metal chassis and is affixed on an inside surface of the metal chassis so the metal shield substantially covers the video surge protectors and effectively shields them from interference from active devices housed within the metal chassis.

In another embodiment of the present invention, an apparatus for protecting a digital video recording system is provided. This includes a metal chassis with a plurality of video surge protectors each having a video input connector, a video output connector and a surge protection circuit. The video surge protectors are mounted on a conductive plate that is configured to cover an opening in the metal chassis and affixed thereto. The video surge protectors are electrically isolated from each other and are electrically isolated from the metal chassis. A metal shield covers the opening of the metal chassis and is electrically and physically attached to cover the opening of the metal chassis on an inside surface. The metal shield substantially covers the video surge protectors, effectively shielding the video surge protectors from interference from other devices housed within said metal chassis. Also included is an uninterruptible power supply housed within and mounted to the metal chassis, a power line surge protector also housed within and mounted to the metal chassis, a telephone line protection module substantially housed within and mounted to the chassis and a network protection module, also substantially housed within and mounted to the chassis.

In another embodiment of the present invention, a means for protecting a digital video recording system is provided, including a means for enclosing electronic circuitry, a means for providing a plurality of video surge protectors, each having a video input connector, a video output connector and a surge protection circuit. Also included is a means for mounting the plurality of video surge protectors on a conductive plate covering an opening in the means for enclosing as well as a means for shielding the plurality of video surge protectors physically attached to cover the opening on an inside surface and substantially covering the plurality of video surge protectors, effectively shielding them from interference emanating from other devices housed within the means for enclosing. Also included is a means to provide uninterrupted power to an external device, also mounted within the means for enclosing.

In another embodiment of the present invention, a method of protecting a digital video recording system is disclosed providing a plurality of video surge protectors each having a video input connector, a video output connector and a surge protection circuit and mounting them on a conductive plate. Additionally an uninterruptible power supply is provided and the video surge protectors are shielded from the uninterruptible power supply to reduce radio frequency noise that may interfere with video signals. The video surge protectors and uninterruptible power supply are enclosed within a metal chassis. In this, the conductive plate is affixed to the metal chassis so that each of the video output connectors and each of the video input connectors is accessible from outside of the metal chassis and the video surge protectors are shielded from the uninterruptible power supply.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
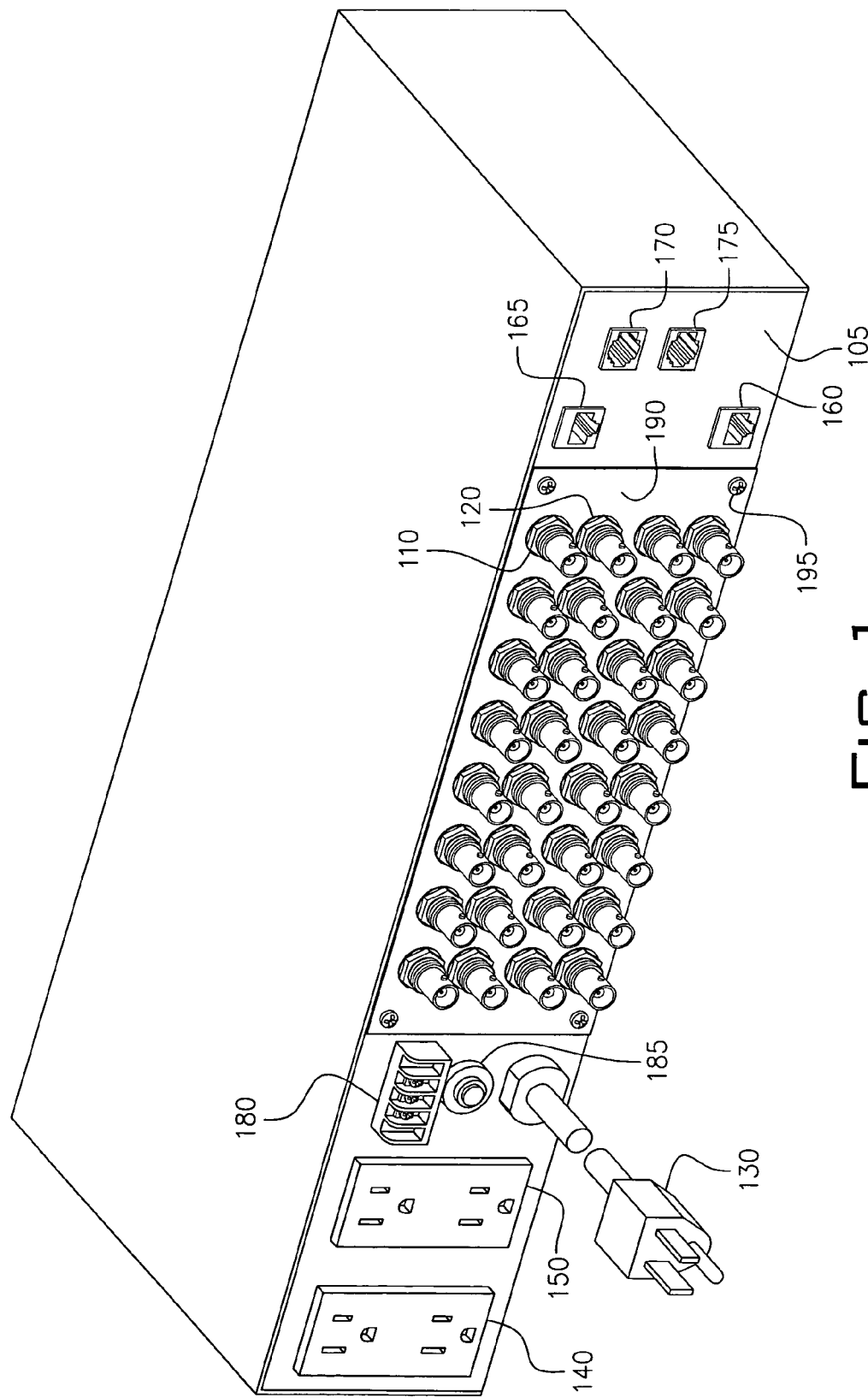
FIG. 1 illustrates a rear view of an embodiment of the present invention.

Reference will now be made in detail to the presently preferred embodiments of the invention, examples of which are illustrated in the accompanying drawings.

Throughout the following detailed description, the same reference numerals refer to the same elements in all figures.

Referring to FIG. 1, a back view of the present invention is shown. The system is enclosed in a metal chassis 105, preferably, metal such as aluminum, copper or steel. The chassis may be painted or not, or may be enclosed by an outer shell made of, perhaps, an insulative material such as plastic without veering from the present invention. Shown is a field of video connectors, half of which are video input connectors and the other half are video output connectors. For example, connector 110 is a video input connector and connector 120 is a video output connector. In this example, there are 16 video input connectors and 16 video output connectors, but any number of video input and video output pairs may be provided without veering from the present invention. In this embodiment, the video input connectors are BNC connectors, but in other embodiments some or all may be twisted pair connectors. Furthermore, in some embodiments some inputs may be of one type of connector and some outputs may be of another type of connector and a Balun may be provided to convert between types of video transmission line. The video input and output connectors are mounted on a conductive plate 190 and the conductive plate is fastened to the metal chassis with four fasteners 195, though any number of type of fastener my be used. In this way, if a power surge on one or more of the video connectors destroys a surge protection circuit, the field of video connectors and their associated surge protection circuits may be removed from the metal chassis 105 by unfastening the fasteners 195, removing the conductive plate 190 along with the video connectors 110/120 and protection circuits and replacing it with a new conductive plate 190 with new video connectors 110/120 and video protection circuits.

Also shown in this example is a line voltage input 130, in this example, a North American standard 120V line cord is shown, though in other embodiments, this could be a different line input, perhaps a DC line input or a different AC voltage, frequency or connector. Additionally, there are four female line voltage output connectors (140 and 150) for providing power to a protected device. In some embodiments, the female line voltage output connectors (140 and 150) are connected directly to the line voltage input. In other embodiments one or more of the female line voltage output connectors (140 and 150) are connected to the line voltage input through one or more surge protectors. Still yet in other embodiments, one or more of the female line voltage output connectors (140 and 150) may be connected to a uninterruptible power supply which is in turn connected to the line voltage input and is configured to provide line voltage output should the line voltage input fail, perhaps in a power outage. Any combination of direct connection, surge protection or uninterruptible power supply configurations may be used without veering from the present invention. This uninterruptible power supply is just one example of an active device that may be housed within the same metal chassis as the video surge protectors.

Also shown in FIG. 1 are two network connectors, a network input connector 160 and a network output connector 165. In some embodiments, a network protection module is provided to protect data networks from power surges and that protection module is configured to protect network devices connected to one network connector of the system from power surges emanating from devices on the other network connector.

Also shown in FIG. 1 are two phone line connectors, a phone line input connector 170 and a phone line output connector 175. In some embodiments, a phone line protection module is provided to protect phone networks and equipment from power surges and that protection module is configured to protect phone line devices connected to one phone line connector of the system from power surges emanating from devices on the other phone line connector.

Also shown in FIG. 1 is a set of dry contacts 180. In some embodiments, these are provided so that the status of the system may be monitored from remote locations.

Also shown in FIG. 1 is a reset button 185 for, in some embodiments, resetting the system after a fault is detected and then cleared.

Figure 2:
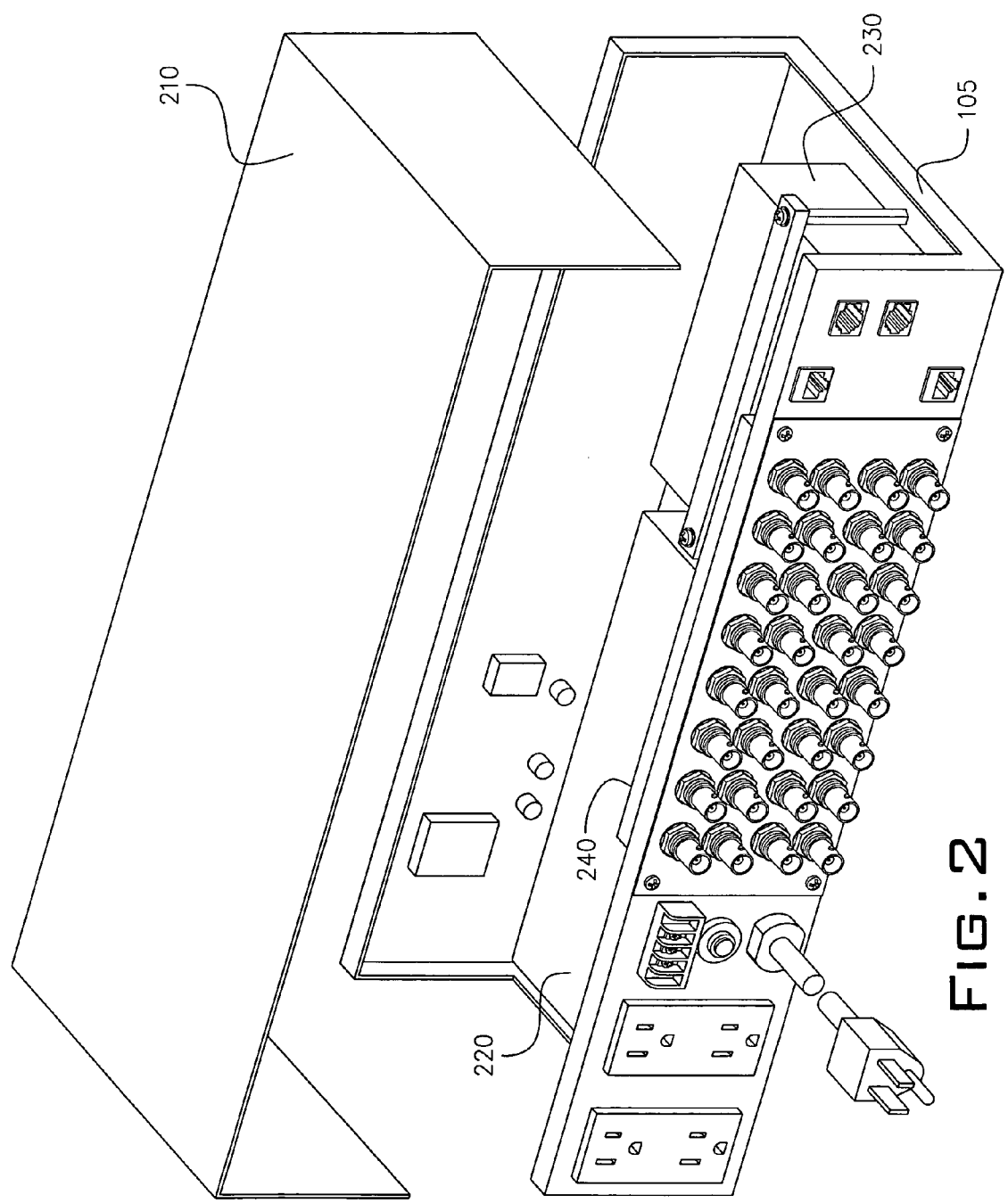
FIG. 2 illustrates a rear view of an embodiment of the present invention with the top cover partially removed.

FIG. 2 shows a back view of the present invention with the cover 210 removed, exposing internal components. The system is enclosed in a metal chassis 105, preferably metal such as aluminum, copper or steel. The chassis may be painted or not, or may be enclosed by an outer shell made of, perhaps, an insulative material such as plastic without veering from the present invention. Shown is a field of video connectors, half of which are video input connectors and the other half are video output connectors. For example, connector 110 is a video input connector and connector 120 is a video output connector. In this example, there are 16 video input connectors and 16 video output connectors, but any number of video input and video output pairs may be provided without veering from the present invention. The video input and output connectors are mounted on a conductive plate 190 and the conductive plate is fastened to the metal chassis with four fasteners 195, though any number of type of fastener my be used. In this way, if a power surge on one or more of the video connectors destroys the protection circuit, the field of video connectors and their associated surge protection circuits may be removed from the metal chassis 105 by unfastening the fasteners 195, removing the conductive plate along with the video connectors and protection circuits and replacing it with a new conductive plate with new video connectors and protection circuits.

In FIG. 2, internal components are visible, including the line surge protector and uninterruptible power supply module 220 and a battery 230 for power back up. Also, the top of a metal shield 240 that is configured to shield the field of video connectors and their protection circuits from noise generated by other circuits within the metal chassis is shown.

Figure 3:
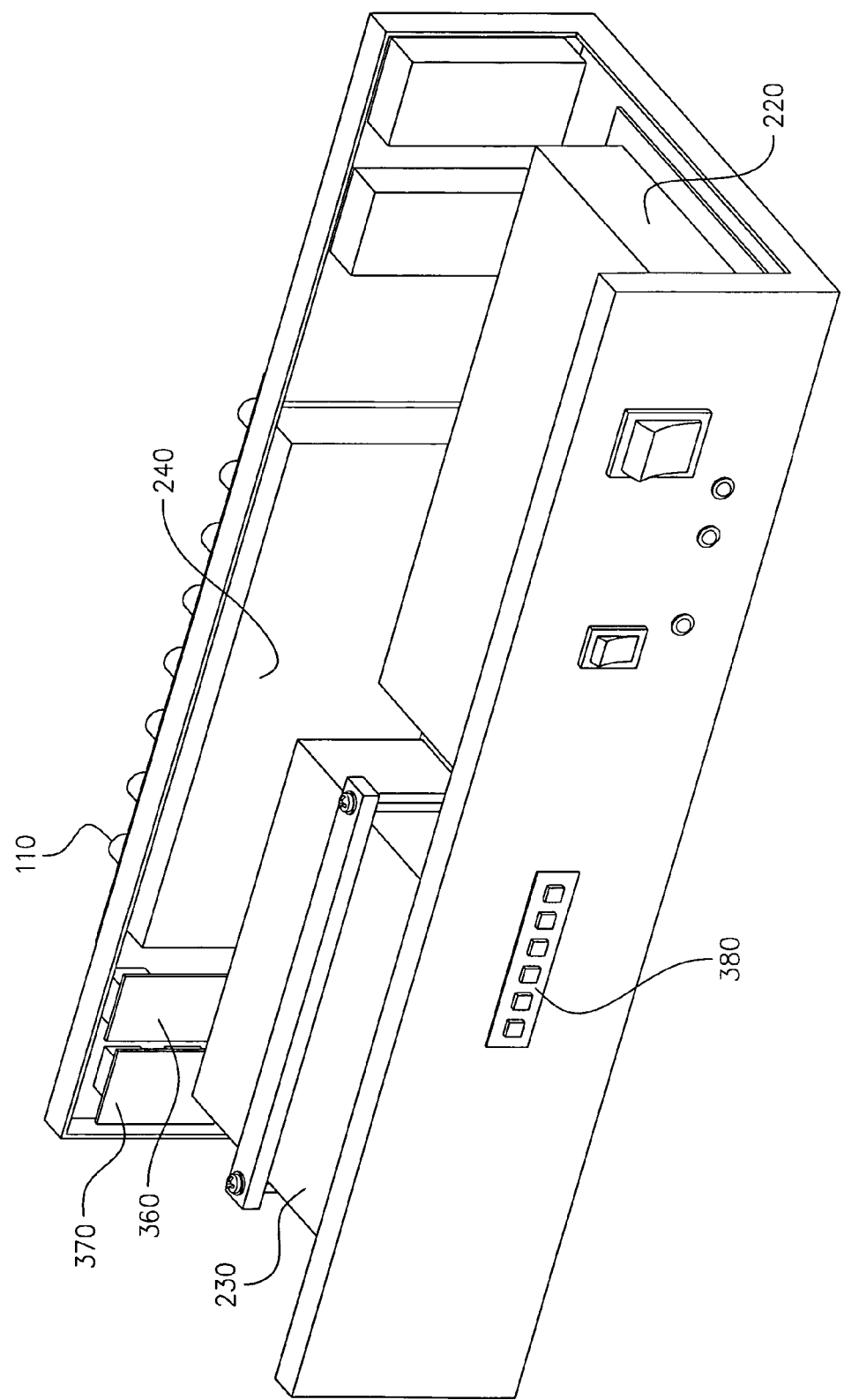
FIG. 3 illustrates a front view of an embodiment of the present invention with the top cover removed.

Referring to FIG. 3, a front view of the present invention is shown with the cover removed and internal components are visible, including the line surge protector and universal power supply module 220 and a battery for power back up 230. Also, the back of the metal shield 240 that is configured to shield the field of video connectors and their protection circuits from noise generated by other circuits within the metal chassis is shown. The top row of video connectors can be seen, for example, video input connector 110. In some embodiments, an uninterruptible power supply load monitoring circuit is supplied with a display 380 that indicates the load being drawn from the power output connectors (140 and 150 from FIG. 1). As shown, this display 380 can be a set of light emitting diodes (LEDs) forming a bar graph, whereas, the right most LED may indicate a small load amount and the left most LED may indicate a large load amount, so as the load increases, the LEDs light from right to left. The LEDs may be configured in an additive scheme and may be assigned linear power increments or logarithmic power increments. In other embodiments, the LEDs may be colored; perhaps the lower current LED being green, the medium current LED being yellow and the highest current LED being red. In alternate embodiments, a meter or digital display can be used instead of the LEDs or any other current indicator may be used.

Also show in FIG. 3 is a network protection circuit 360. In some embodiments, a network protection module is provided to protect data networks from power surges and that protection module is configured to protect network devices connected to one network connector of the system from power surges emanating from devices on the other network connector.

Also show in FIG. 3 is a phone line protection circuit 370. In some embodiments, a phone line protection module is provided to protect phone networks and equipment from power surges and that protection module is configured to protect phone line devices connected to one phone line connector of the system from power surges emanating from devices on the other phone line connector.

Figure 4:
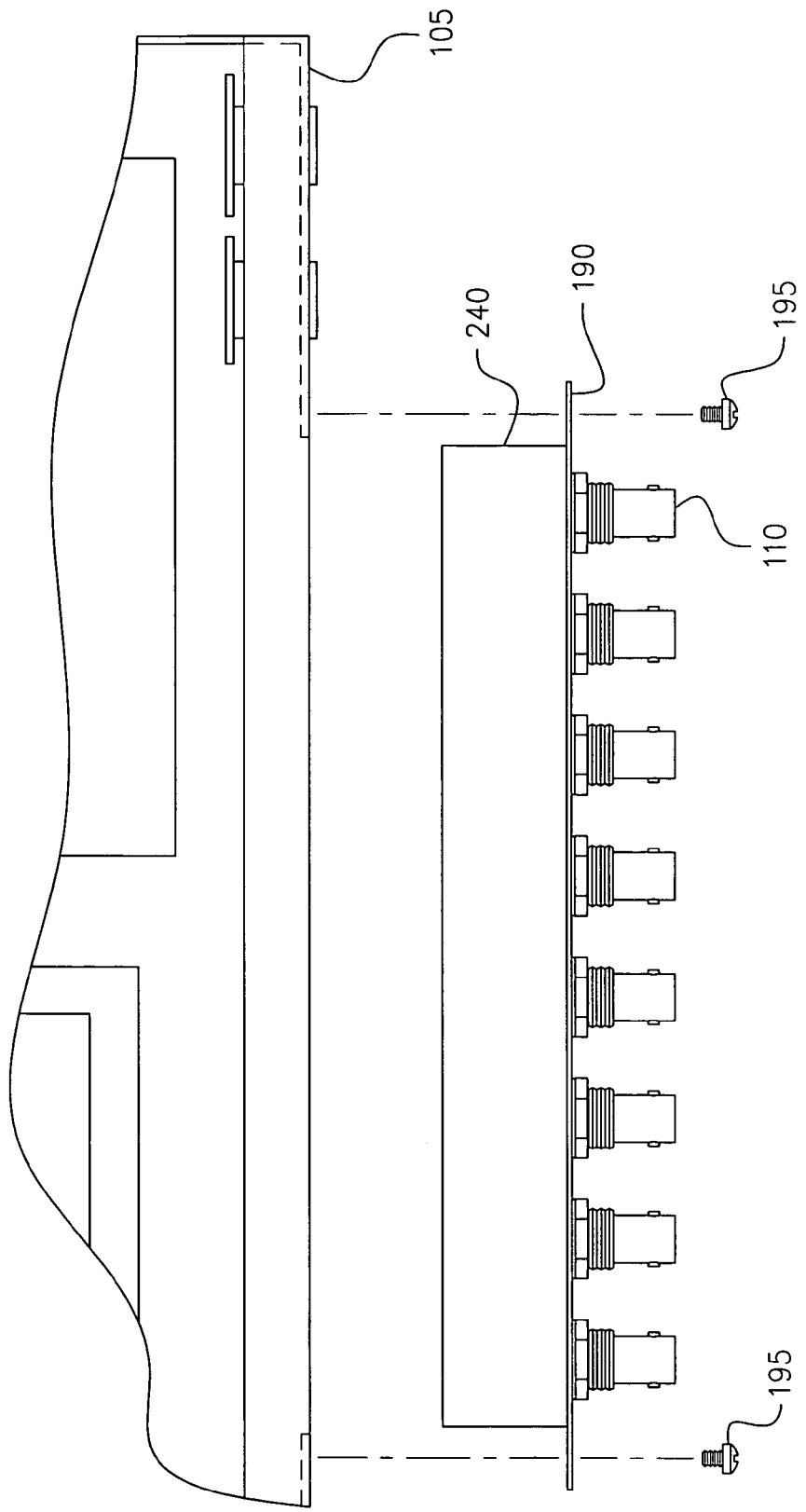
FIG. 4 illustrates a cut-away top view of an embodiment of the present invention.

FIG. 4 shows a cut away view of the back of the metal chassis 105 looking down from the top, showing the field of video connectors mounted to the conductive plate 190. When engaged within the metal chassis 105, the conductive plate 190 is affixed to the metal chassis 105 by a plurality of fasteners 195. Connected to the component side of the video connectors is a video protection circuit board 420, containing an isolated video protection circuit 710 for each video input/output pair, for example. The video protection circuits 710 may protect a variety of video standards operating at various peak-to-peak voltages, including providing protection at either 2.8 volts or 6.8 volts. In some embodiments, the video protection circuit 710 may also include video transmission conversion circuits, perhaps to convert between video transmission schemes and impedances, perhaps converting between a COAX transmission scheme and a twisted-pair transmission scheme or visa versa. In this example, a top row of video inputs 110 is shown as BNC connectors, and the video outputs, also BNC connectors) are hidden. In alternate embodiments, the inputs may be BNC for COAX connection and the outputs may be connectors for twisted pair connectors or visa versa.

Surrounding the video protection circuit board 420 is a conductive shield 240 which may be made from a metal such as copper, aluminum or steel. In this embodiment, the conductive shield 240 is affixed to the conductive plate 190.

Figure 5:
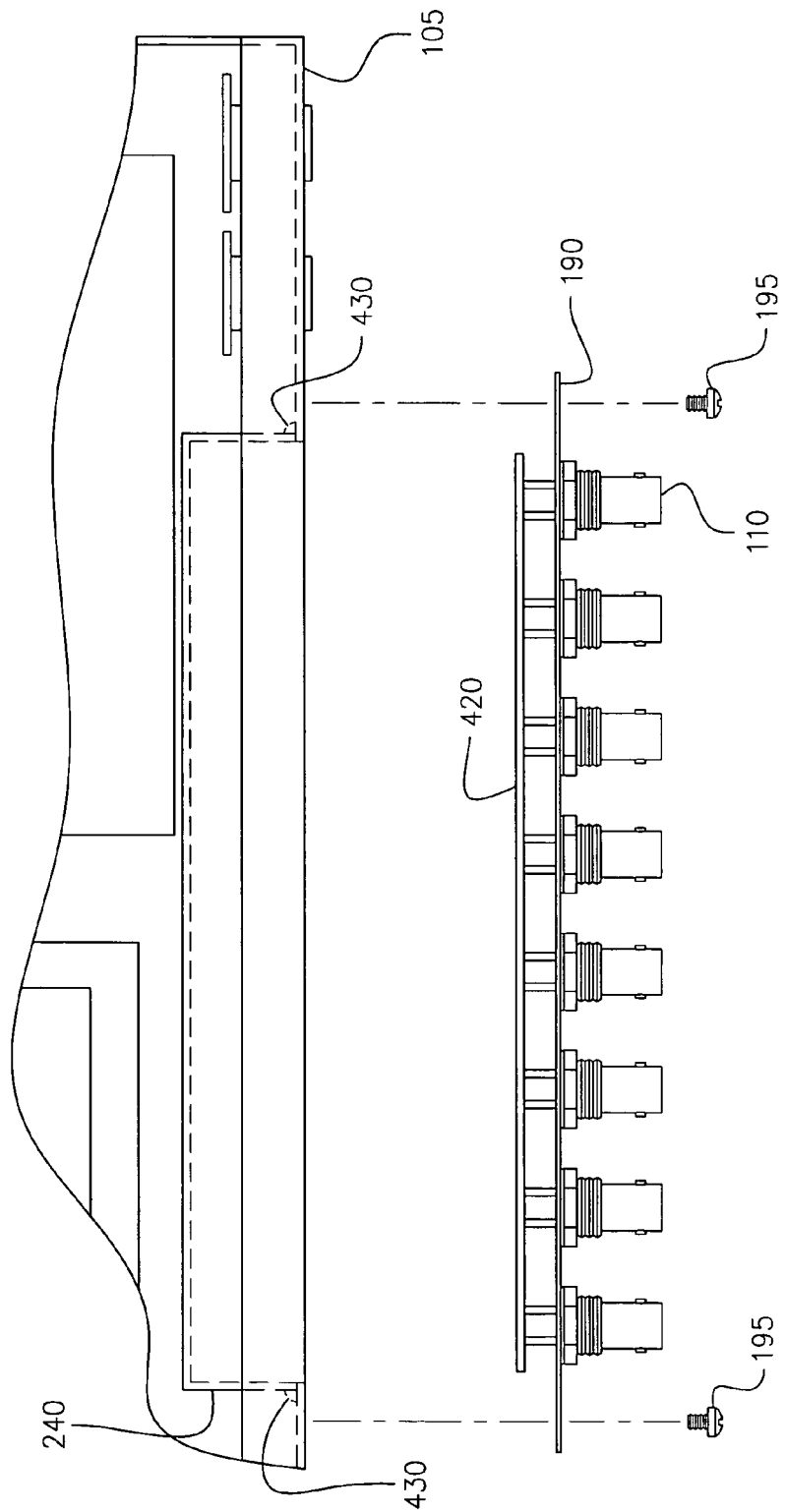
FIG. 5 illustrates a cut-away top view of an embodiment of the present invention.

FIG. 5 shows a cut away view of the back of the metal chassis 105 looking down from the top, showing the field of video connectors mounted to the conductive plate 190. When engaged with the metal chassis 105, the conductive plate 190 is affixed to the metal chassis 105 by a plurality of fasteners 195. Connected to the component side of the video connectors is a video protection circuit board 420, containing an isolated video protection circuit for each video input/output pair, for example. In some embodiments, the video protection circuit may also include video transmission conversion circuits, perhaps to convert between video transmission schemes and impedances, perhaps converting between a COAX transmission scheme and a twisted-pair transmission scheme or visa versa. In this example, a top row of video inputs 110 is shown as BNC connectors, and the video outputs, also BNC connectors) are hidden. In alternate embodiments, the inputs may be BNC for COAX connection and the outputs may be pluggable terminal blocks for twisted pair connectors such as a Molex 5.08 mm pitch BeauEurostyle® Pluggable PCB Terminal Block or visa versa.

Within the metal chassis 105 and configured to surround the video protection circuit board when the conductive plate 190 is installed on the metal chassis 105, is a conductive shield 240 which may be made from a metal such as copper, aluminum or steel. The conductive shield 240 is affixed to the metal chassis 105 at points 430 by any means known in the industry including welding, tack soldering and fastening with a plurality of fasteners.

Figure 6:
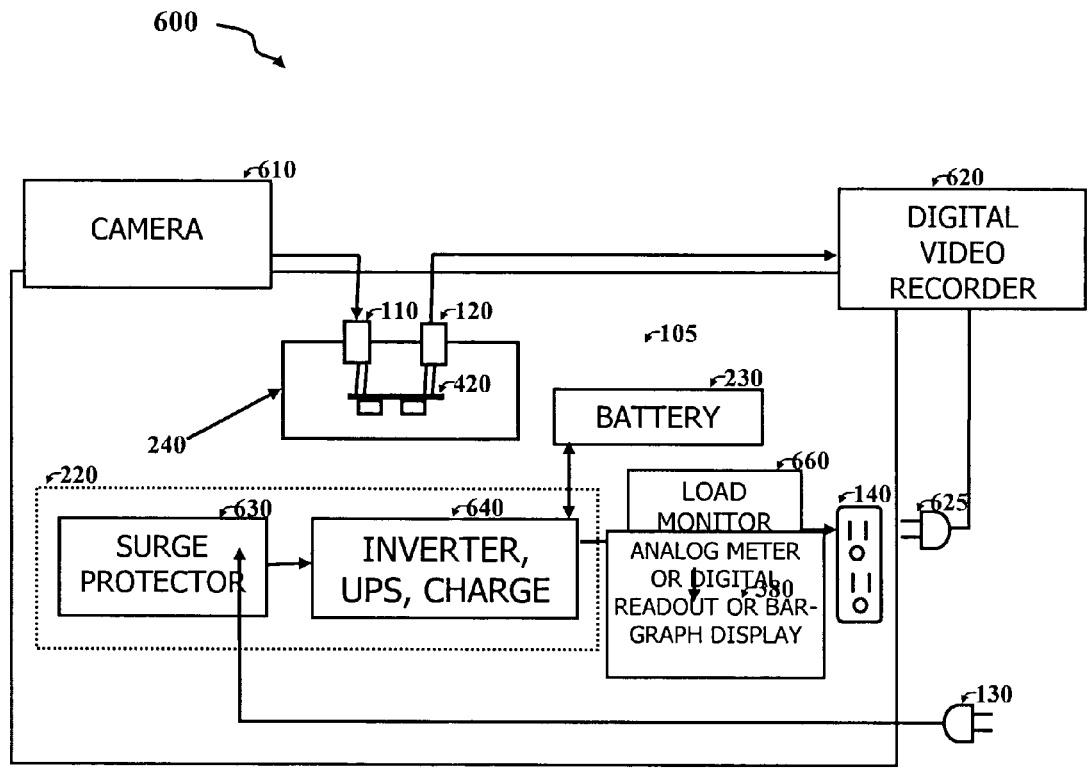
FIG. 6 illustrates a schematic view of an embodiment of the present invention.

FIG. 6 shows a schematic diagram 600 of the present invention. In this, a video camera 610 is connected to a video input connector 110, which is electrically isolated from the metal chassis 105. The video signal from the camera 610 passes through the video input connector 110 and onto a video protection circuit board 420, on which a video protection circuit helps prevent potentially harmful electrical surges from passing through to the video output connector 120. The video signal passes through the video output connector 120 and to a digital video recorder 620. In some embodiments, the video signal passes through a video multiplexor or switch (not shown) before reaching the digital video recorder 620.

Also within the metal chassis 105 is an uninterruptible power supply consisting of a battery 230 and an inverter/uninterruptible power supply (UPS)/charger 640. The inverter portion converts the battery voltage to the desired output voltage when the input power is lost or reduced. The uninterruptible power supply monitors the input power and determines if it can charge the battery using the charger or if it has to supply power from the battery using the inverter. The uninterruptible power supply receives input power from a line voltage input 130 that is protected by a surge protector 630 before reaching the uninterruptible power supply 640. Together, the surge protector 630 and inverter/UPS/charger 640 may be enclosed in one package or on a single circuit board 220. In some embodiments, the output of the uninterruptible power supply goes through the load monitor circuit 660 and to the line voltage output connectors 140. In other embodiments, the output of the uninterruptible power supply goes directly to the line voltage output connectors 140. In this example two female power output connectors are shown, but there are no restrictions on the number of line voltage output connectors that may be present. The digital video recorder's 620 power input plug 625 may be plugged into one of the line voltage output connectors 140 so as to receive surge protected and uninterruptible power from this system.

In some embodiments, an uninterruptible power supply load monitoring circuit 660 is supplied with a display 380 that indicates the load being drawn from the power output connectors 140. This display can be a set of light emitting diodes (LEDs) forming a bar graph, whereas, the right most LED may indicate a small load amount and the left most LED indicate a large load amount, so as the load increases, the LEDs light from right to left. The LEDs may be configured in an additive scheme and may be assigned linear power increments or logarithmic power increments. In other embodiments, the LEDs may be colored; perhaps the lower current LED being green, the medium current LED being yellow and the highest current LED being red. In alternate embodiments, an analog meter or digital readout display can be used instead of the LEDs or any other current indicator may be used.

Being that the uninterruptible power supply and other modules housed within the metal chassis 105 may generate radio frequency noise, a conductive shield 240 shields the video protection circuits and connectors from this noise.

Figure 7:
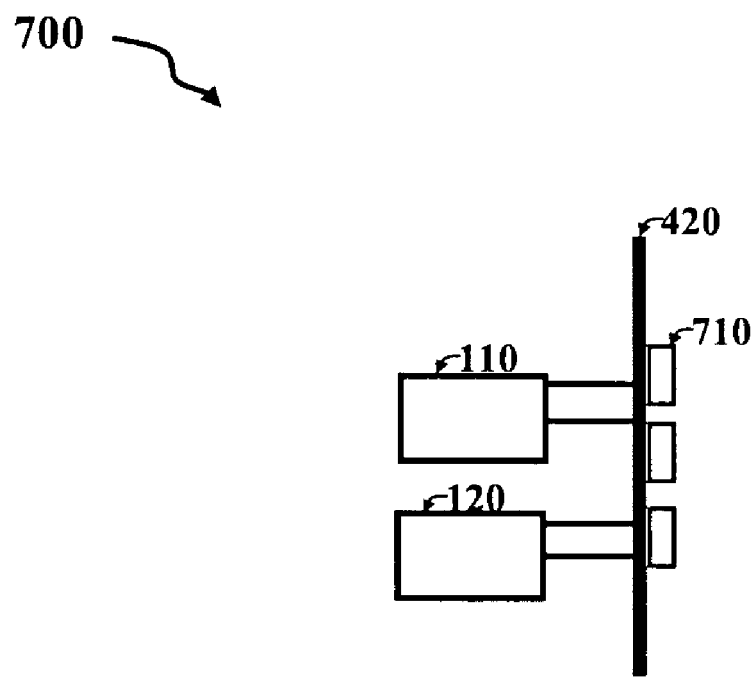
FIG. 7 illustrates a schematic view of an embodiment of a video protection module of the present invention.

FIG. 7 shows a schematic view 700 of an embodiment of a video protection module of the present invention. Video input connector 110 and video output connector 120 are connected to the video protection circuit board 420. The video protection circuit 710 is shown mounted upon the back side of the video protection circuit board 420. The video protection circuit 710 may be of various types known in the industry and include components such as resistors, capacitors, inductors, diodes and metal-oxide varistors (MOVs) for the purpose of allowing video signals to pass from the video input connector 110 to the video output connector 120 while suppressing power surges.

Equivalent elements can be substituted for the ones set forth above such that they perform in substantially the same manner in the same way for achieving the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

Having described the invention, what is claimed for Letters Patent follows:

1. A system for protecting a digital video recording system comprising:
   a metal chassis;
   a battery housed within said metal chassis;
   an uninterruptible power supply housed within said metal chassis, said uninterruptible power supply connected to said battery for providing power during a power disruption;
   a line voltage input configured to receive power from an external power source;
   a surge protector circuit, said line voltage input connected to an input of said surge protector circuit, said surge protector circuit housed within said metal chassis, whereas said surge protector circuit is connected to provide power to said uninterruptible power supply;
   at least one female line voltage output connector, said at least one female line voltage output connector configured to receive power from said uninterruptible power supply, said at least one female line voltage output connector attached to said metal chassis and passing through an opening in a wall of said metal chassis; and
   a plurality of video surge protectors each having a video input connector, a video output connector and a surge protection circuit, said plurality of video surge protectors mounted upon a conductive plate, said conductive plate configured to cover a second opening of said metal chassis and affixed thereto, each of said plurality of video surge protectors electrically isolated from the rest of said plurality of video surge protectors and each of said plurality of video surge protectors electrically isolated from said metal chassis.

2. The system of claim 1, further comprising a metal shield, said metal shield electrically and physically attached to cover said second opening of said metal chassis on an inside surface of said metal chassis, wherein said metal shield substantially covers said plurality of video surge protectors, effectively shielding said plurality of video surge protectors from interference from said uninterruptible power supply.

3. The system of claim 1, further comprising a metal shield, said metal shield electrically and physically attached to said conductive plate, said metal shield configured to substantially cover said plurality of video surge protectors, effectively shielding said plurality of video surge protectors from interference from said uninterruptible power supply.

4. The system of claim 1, further comprising a network protection module having a network input connection that is externally accessible from said metal chassis, a network output connection that is externally accessible from said metal chassis and a network surge protector, said network protection module housed within said metal chassis.

5. The system of claim 1, further comprising a phone protection module having a phone input connection that is externally accessible from said metal chassis, a phone output connection that is externally accessible from said metal chassis and a phone line protection circuit, said phone protection module housed within said metal chassis.

6. The system of claim 1, wherein said video input connector and video output connector is a BNC type connector.

7. The system of claim 2, wherein said video input connector and video output connector is a BNC type connector.

8. The system of claim 3, wherein said video input connector and video output connector is a BNC type connector.

9. The system of claim 1, wherein said video input connector and video output connector is a twisted-pair type connector.

10. The system of claim 2, wherein said video input connector and video output connector is a twisted-pair type connector.

11. The system of claim 3, wherein said video input connector and video output connector is a twisted-pair type connector.

12. The system of claim 1, wherein said plurality of video surge protectors protects from voltages greater than approximately 2.8 volts.

13. The system of claim 2, wherein said plurality of video surge protectors protects from voltages greater than approximately 2.8 volts.

14. The system of claim 3, wherein said plurality of video surge protectors protects from voltages greater than approximately 2.8 volts.

15. The system of claim 1, wherein said plurality of video surge protectors protects from voltages greater than approximately 6.8 volts.

16. The system of claim 2, wherein said plurality of video surge protectors protects from voltages greater than approximately 6.8 volts.

17. The system of claim 3, wherein said plurality of video surge protectors protects from voltages greater than approximately 6.8 volts.

18. The system of claim 1, further comprising a load monitoring circuit housed within said metal chassis and connected in series with said uninterruptible power supply and said at least one female line voltage output connector, said load monitoring circuit having a display configured to indicate an approximate output load.

19. The system of claim 18, wherein said display is a bar graph, said bar graph comprising a plurality of light emitting diodes.

20. The system of claim 18, wherein said display is an analog meter.

21. The system of claim 18, wherein said display is a digital readout.

22. An apparatus for protecting a digital video recording system comprising:
a metal chassis;
a plurality of video surge protectors each having a video input connector, a video output connector and a surge protection circuit, said plurality of video surge protectors mounted upon a conductive plate, said conductive plate configured to cover an opening of said metal chassis and removably affixed thereto, each of said plurality of video surge protectors being electrically isolated from the rest of said plurality of video surge protectors and each of said plurality of video surge protectors being electrically isolated from said metal chassis; and
a metal shield, said metal shield electrically and physically attached to said conductive plate on the side of said conductive plate that mates with said metal chassis, whereas said metal shield substantially covers said plurality of video surge protectors, effectively shielding said plurality of video surge protectors from interference from an active device, said active device being substantially housed within said metal chassis.

23. The apparatus of claim 22, wherein said active device is one or more devices selected from a group consisting of an uninterruptible power supply, a line-voltage surge protector, a phone-line protection module and a network protection module.

24. The apparatus of claim 22, wherein said video input connector and video output connector is a BNC type connector.

25. The apparatus of claim 22, wherein said video input connector and video output connector is a twisted-pair type connector.

26. The system of claim 22, wherein said conductive plate is removably affixed to said metal chassis by a plurality of fasteners and therefore, said conductive plate along with said plurality of video surge protectors is externally removable and replaceable.

27. An apparatus for protecting a digital video recording system comprising:
a metal chassis;
a plurality of video surge protectors each having a video input connector, a video output connector and a surge protection circuit, said plurality of video surge protectors mounted upon a conductive plate, said conductive plate configured to cover an opening of said metal chassis and removably affixed thereto, each of said plurality of video surge protectors electrically isolated from the rest of said plurality of video surge protectors and each of said plurality of video surge protectors electrically isolated from said metal chassis;
an uninterruptible power supply housed within and mounted to said metal chassis;
a metal shield, said metal shield electrically and physically attached to said conductive plate on the side of said conductive plate that mates with said metal chassis, whereas said metal shield substantially covers said plurality of video surge protectors, effectively shielding said plurality of video surge protectors from interference from said uninterruptible power supply;
a power line surge protector housed within and mounted to said metal chassis;
a telephone line protection module substantially housed within and mounted to said metal chassis; and
a network protection module substantially housed within and mounted to said metal chassis.

28. The apparatus of claim 27, wherein said conductive plate is removably affixed to said metal chassis by fasteners and therefore, said conductive plate along with said plurality of video surge protectors is externally removable and replaceable.

29. The apparatus of claim 27, wherein said video input connector and video output connector is a BNC type connector.

30. The apparatus of claim 27, wherein said video input connector and video output connector is a twisted-pair type connector.

31. The apparatus of claim 27, wherein said plurality of video surge protectors protects from voltages greater than approximately 2.8 volts.

32. The apparatus of claim 27, wherein said plurality of video surge protectors protects from voltages greater than approximately 6.8 volts.

33. A protective apparatus for a digital video recording system comprising:
a means for enclosing a portion of the digital video recording system;
a means for providing a plurality of video surge protectors each having a video input connector, a video output connector and a video surge protection circuit;

a means for mounting said plurality of video surge protectors on a conductive plate, said conductive plate configured to cover an opening in said means for enclosing, whereas said video output connector and said video input connector are accessible outside of said means for enclosing and said video surge protection circuit is substantially within said means for enclosing;

a means for providing uninterrupted power to an external device, said means to provide uninterrupted power mounted within said means for enclosing; and a means for shielding said plurality of video surge protectors, said means for shielding physically and electrically attached to said conductive plate and covering said surge protection circuit, effectively shielding said video surge protectors from interference from said means for providing uninterrupted power.

34. A method of protecting a digital video recording system comprising:

providing a plurality of video surge protectors each having a video input connector, a video output connector and a video surge protection circuit;

mounting said plurality of video surge protectors on a conductive plate;

providing an uninterruptible power supply;

shielding said plurality of video surge protectors from said uninterruptible power supply;

enclosing said uninterruptible power supply within a metal chassis; and affixing said conductive plate to said metal chassis such that each of said video output connectors is accessible from outside of said metal chassis and each of said video input connectors is accessible from outside of said metal chassis and said video surge protectors are shielded from said uninterruptible power supply.

35. The method of claim 34, wherein said shielding comprises a metal shield affixed to said metal chassis between said video surge protectors and said uninterruptible power supply.

36. The method of claim 34, wherein said shielding comprises a metal shield affixed to said conductive plate between said video surge protectors and said uninterruptible power supply.

* * * * *